United States Patent

Hashimoto et al.

(10) Patent No.: US 10,298,866 B2
(45) Date of Patent: May 21, 2019

(54) PHOTOELECTRIC CONVERSION ELEMENT, IMAGE READING DEVICE, IMAGE FORMING APPARATUS, IMAGE READING METHOD, AND COMPUTER-READABLE RECORDING MEDIUM

(71) Applicants: Hideki Hashimoto, Tokyo (JP); Masamoto Nakazawa, Kanagawa (JP)

(72) Inventors: Hideki Hashimoto, Tokyo (JP); Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/387,074

(22) Filed: Dec. 21, 2016

(65) Prior Publication Data

US 2017/0201700 A1    Jul. 13, 2017

(30) Foreign Application Priority Data

Jan. 12, 2016 (JP) ................................ 2016-003734

(51) Int. Cl.
*H04N 5/357* (2011.01)
*H04N 5/365* (2011.01)
(Continued)

(52) U.S. Cl.
CPC ........... *H04N 5/3575* (2013.01); *H04N 5/365* (2013.01); *H04N 5/378* (2013.01); *H04N 5/37455* (2013.01); *H04N 5/3692* (2013.01)

(58) Field of Classification Search
CPC .................................................. H04N 5/3575
See application file for complete search history.

(56) References Cited

U.S. PATENT DOCUMENTS 5,781,312 A * 7/1998 Noda ................... H04N 5/3575
348/272
7,642,947 B2 * 1/2010 Suzuki .................. H04N 5/335
341/118

(Continued)

FOREIGN PATENT DOCUMENTS

| JP | 2002-027331 | 1/2002 |
| JP | 2006-025189 | 1/2006 |
| JP | 2015-130563 | 7/2015 |

OTHER PUBLICATIONS

U.S. Appl. No. 15/191,035, filed Jun. 23, 2016.
U.S. Appl. No. 15/176,395, filed Jun. 8, 2016.

*Primary Examiner* — Cynthia Segura
(74) *Attorney, Agent, or Firm* — Oblon, McClelland, Maier & Neustadt, L.L.P.

(57) ABSTRACT

A photoelectric conversion element includes: light receiving elements that convert an optical signal into an electrical signal per pixel; offset fixing units that fix an offset of an output level of each of the light receiving elements to a reference level; analog/digital conversion units that convert signals respectively corresponding to a signal level being converted from an optical signal and output by the light receiving elements and a reset level output independent of an optical signal, into digital signals, according to the reference level; amplifier units that amplify a signal; and correlated double sampling units that perform correlated double sampling per each of the light receiving elements by using a signal based on the reset level and a signal based on the signal level, wherein the amplifier units amplify the signal corresponding to the reset level and the signal corresponding to the signal level before implementing the correlated double sampling.

10 Claims, 16 Drawing Sheets

(51) Int. Cl.
*H04N 5/3745* (2011.01)
*H04N 5/378* (2011.01)
*H04N 5/369* (2011.01)

(56) References Cited

U.S. PATENT DOCUMENTS

| | | | |
|---|---|---|---|
| 8,885,084 B2* | 11/2014 | Egawa | H04N 5/355 348/300 |
| 9,429,470 B2* | 8/2016 | Hashimoto | G01J 1/46 |
| 9,894,236 B2* | 2/2018 | Nakazawa | H04N 1/193 |
| 2003/0001075 A1* | 1/2003 | Mukherjee | H03F 3/005 250/208.1 |
| 2004/0080637 A1* | 4/2004 | Nakamura | H04N 5/243 348/255 |
| 2005/0162530 A1* | 7/2005 | Matsui | H04N 5/378 348/222.1 |
| 2007/0188638 A1 | 8/2007 | Nakazawa et al. | |
| 2008/0070535 A1* | 3/2008 | Liou | H03G 3/3052 455/232.1 |
| 2008/0136933 A1* | 6/2008 | Dosluoglu | H04N 3/1562 348/223.1 |
| 2008/0252787 A1* | 10/2008 | Nakazawa | H03M 1/0607 348/572 |
| 2008/0259193 A1* | 10/2008 | Toya | H04N 5/217 348/300 |
| 2009/0109315 A1* | 4/2009 | Taura | H03M 1/56 348/311 |
| 2010/0027061 A1 | 2/2010 | Nakazawa | |
| 2010/0171998 A1 | 7/2010 | Nakazawa | |
| 2010/0188275 A1* | 7/2010 | Kaihara | G11B 20/10009 341/132 |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2011/0063693 A1* | 3/2011 | Yoshigae | H04N 1/40056 358/474 |
| 2012/0008173 A1 | 1/2012 | Konno et al. | |
| 2012/0033121 A1* | 2/2012 | Kawata | H04N 5/378 348/308 |
| 2012/0092732 A1 | 4/2012 | Nakazawa | |
| 2012/0133800 A1* | 5/2012 | Jung | H04N 5/3575 348/241 |
| 2012/0211642 A1* | 8/2012 | Iwamoto | H04N 5/35509 250/208.1 |
| 2012/0224205 A1 | 9/2012 | Nakazawa | |
| 2013/0063792 A1 | 3/2013 | Nakazawa | |
| 2013/0089175 A1* | 4/2013 | Mo | H04N 5/355 377/49 |
| 2013/0250332 A1* | 9/2013 | Hiranuma | H04N 1/48 358/1.13 |
| 2014/0029065 A1 | 1/2014 | Nakazawa | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0368893 A1 | 12/2014 | Nakazawa et al. | |
| 2014/0375855 A1* | 12/2014 | Nishihara | H01L 27/14603 348/301 |
| 2015/0098117 A1* | 4/2015 | Marumoto | H04N 1/4076 358/474 |
| 2015/0116794 A1 | 4/2015 | Nakazawa | |
| 2015/0138413 A1* | 5/2015 | Sato | H04N 5/378 348/302 |
| 2015/0163378 A1 | 6/2015 | Konno et al. | |
| 2015/0222790 A1 | 8/2015 | Asaba et al. | |
| 2015/0237278 A1* | 8/2015 | Sakakibara | H04N 5/3698 348/301 |
| 2015/0249797 A1* | 9/2015 | Yui | H04N 5/3575 250/208.1 |
| 2015/0304517 A1 | 10/2015 | Nakazawa et al. | |
| 2016/0003673 A1* | 1/2016 | Hashimoto | G01J 1/46 358/475 |
| 2016/0006961 A1 | 1/2016 | Asaba et al. | |
| 2016/0088179 A1 | 3/2016 | Nakazawa et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0219163 A1 | 7/2016 | Shirado et al. | |
| 2016/0219234 A1* | 7/2016 | Nishihara | H04N 5/378 |
| 2016/0268330 A1 | 9/2016 | Nakazawa et al. | |
| 2016/0295138 A1 | 10/2016 | Asaba et al. | |

* cited by examiner

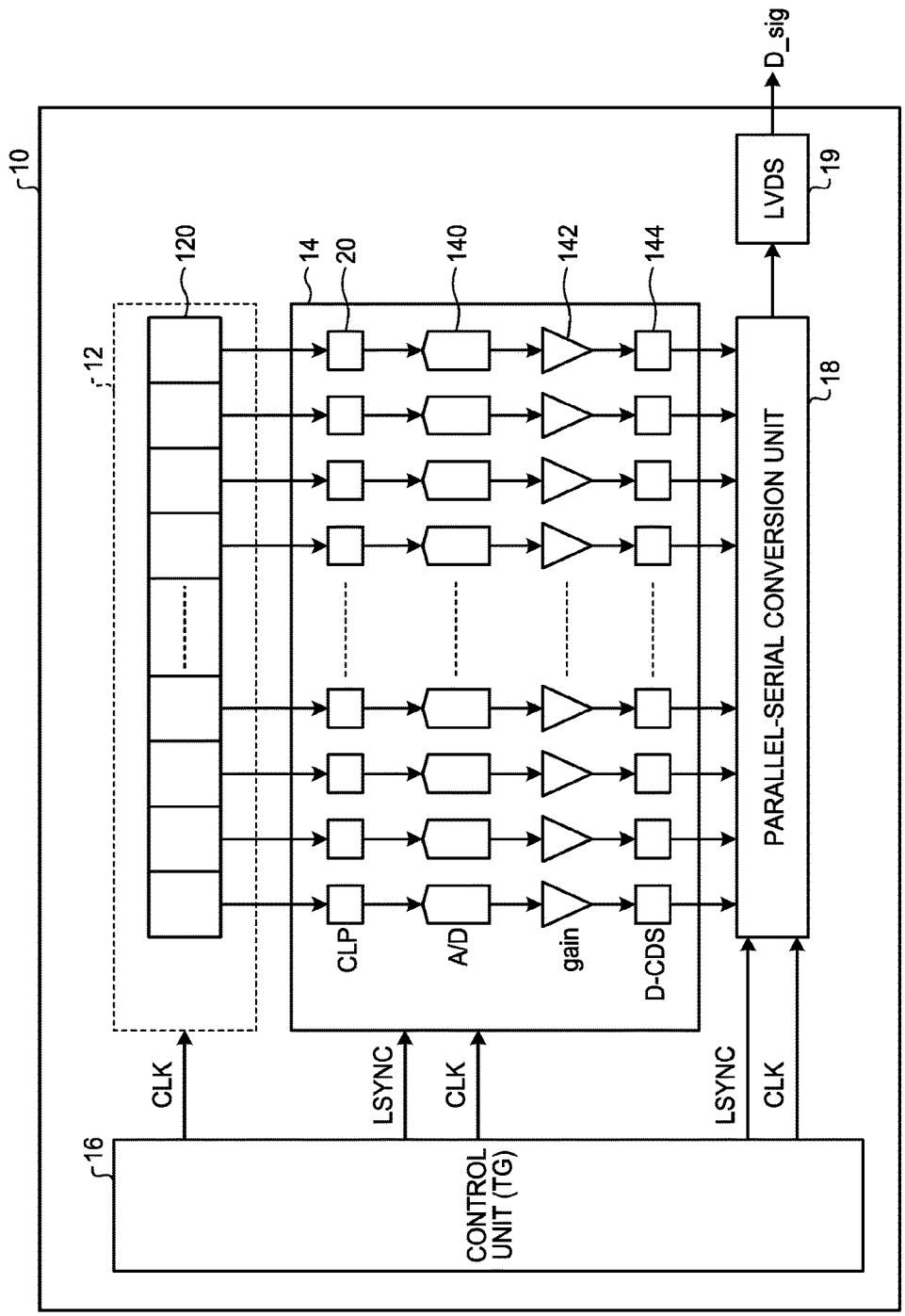

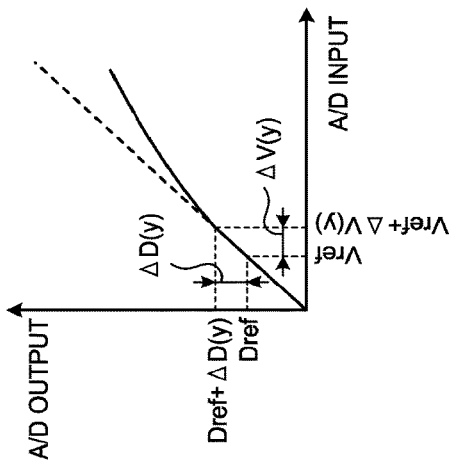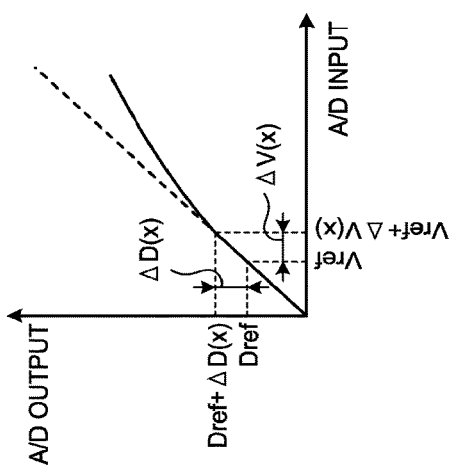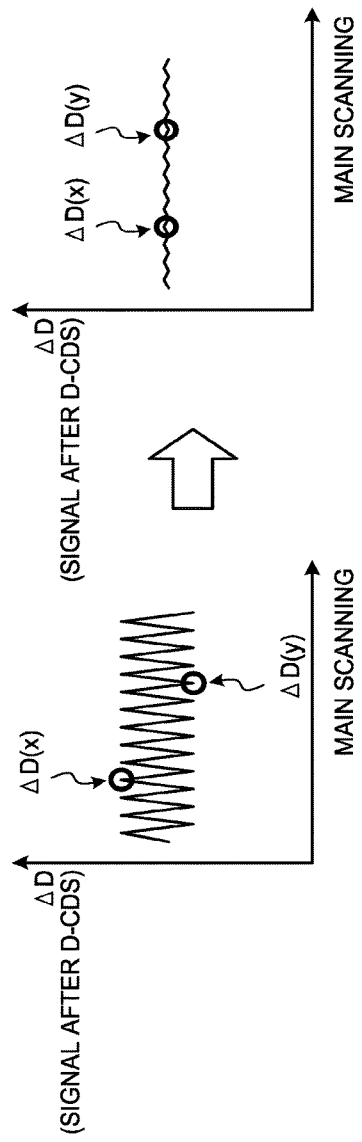

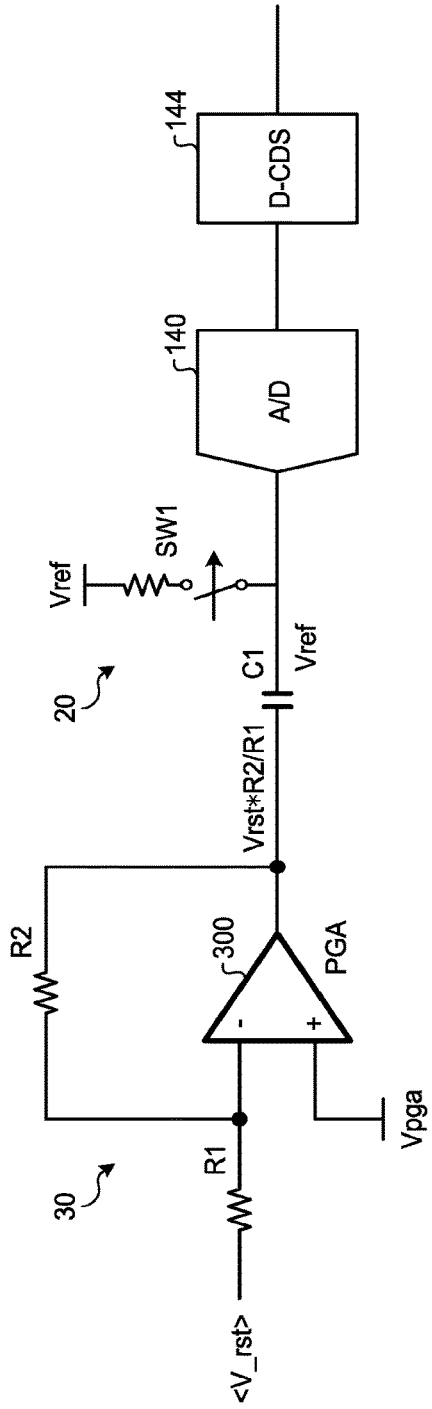
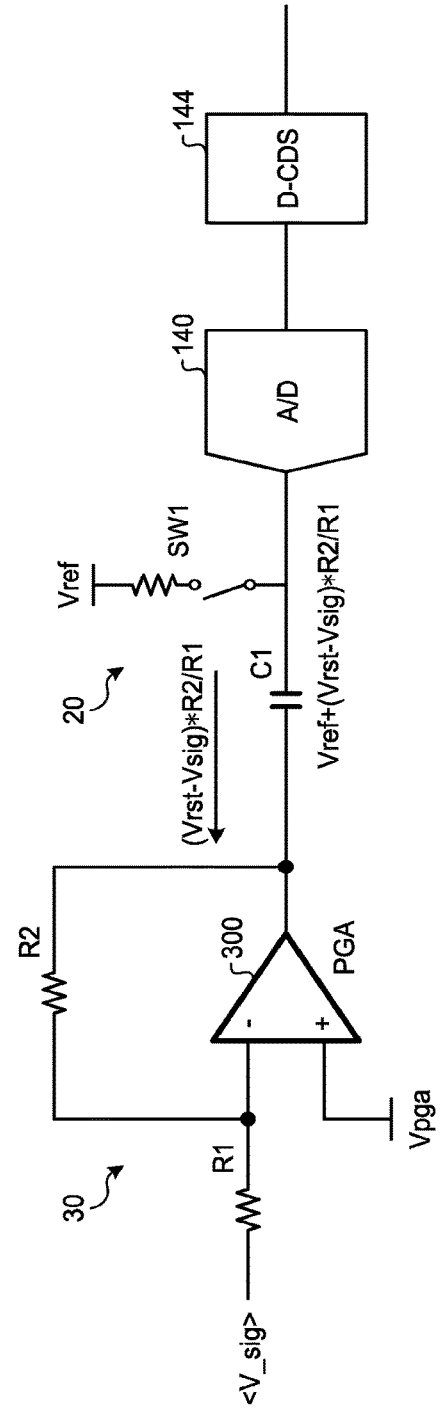

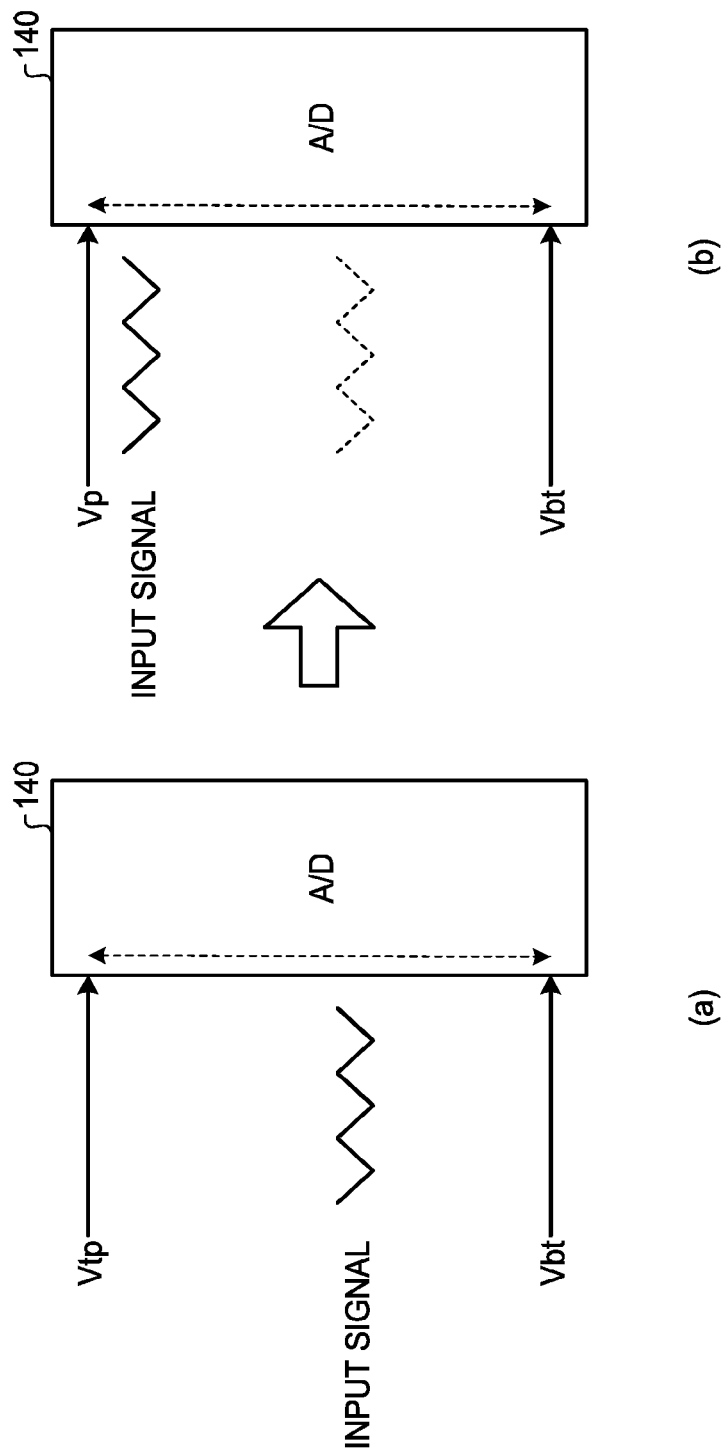

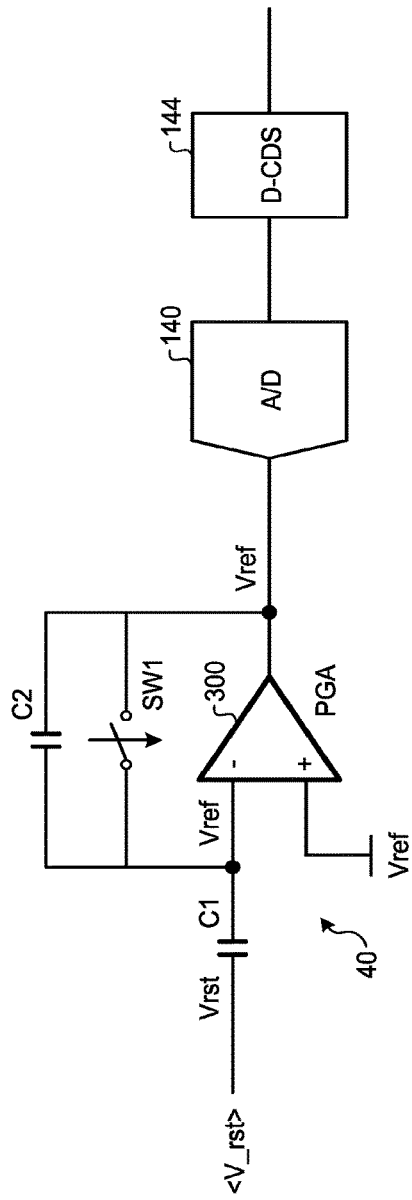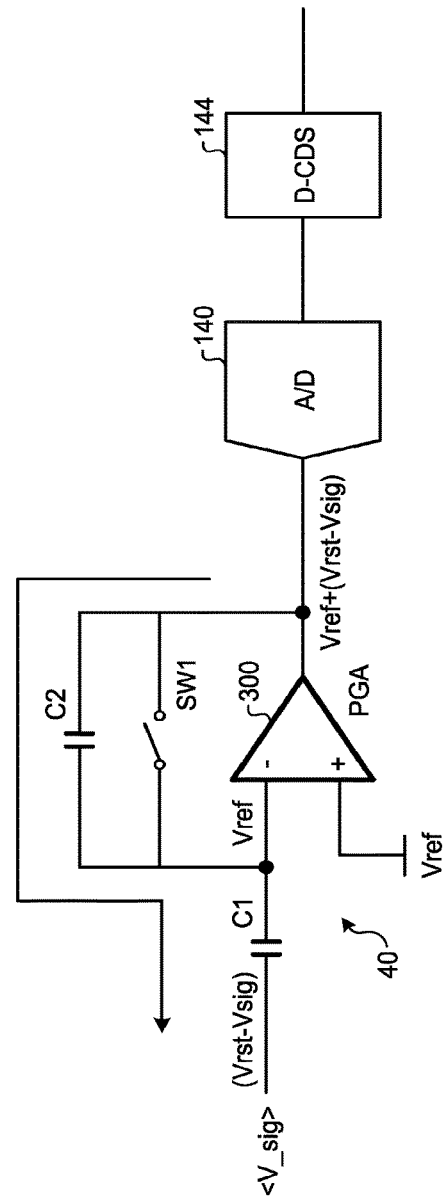

PHOTOELECTRIC CONVERSION ELEMENT, IMAGE READING DEVICE, IMAGE FORMING APPARATUS, IMAGE READING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2016-003734 filed Jan. 12, 2016. The contents of which are incorporated herein by reference in their entirety.

BACKGROUND OF THE INVENTION

1. Field of the Invention

The present invention relates to a photoelectric conversion element, an image reading device, an image forming apparatus, an image reading method, and a computer-readable recording medium.

2. Description of the Related Art

It has been known that correlated double sampling (CDS) is performed to suppress noises in a photoelectric conversion element such as a complementary metal oxide semiconductor (CMOS) image sensor.

Moreover, Japanese Unexamined Patent Application Publication No. 2006-25189 discloses an image sensor that analog/digital (A/D) converts each of a signal level and a reset level from a pixel portion by an AD converter, and stores the signal level and the reset level in a first register and a second register, and acquires, by an adder, a difference between the level signals respectively in a form of digital signal.

However, there has conventionally been a case in which the difference between the reset level and the signal level varies due to a linearity error of the A/D converter because the reset level to be a reference varies when an offset of a pixel varies. This variation causes remaining a fixed pattern noise, and there has been a problem that a sufficient effect for suppressing noises cannot be produced by CDS. Furthermore, if the signal is amplified after implementing the CDS, there has been a problem that the fixed pattern noise gets worse.

In view of the above problems, there is a need to provide a photoelectric conversion element, an image reading device, an image forming apparatus, an image reading method, and a computer-readable recording medium having a program that enable to improve the noise suppression effect by CDS.

SUMMARY OF THE INVENTION

According to exemplary embodiments of the present invention, there is provided a photoelectric conversion element comprising: a plurality of light receiving elements configured to convert an optical signal into an electrical signal per pixel; a plurality of offset fixing units configured to fix an offset of an output level of each of the light receiving elements to a predetermined reference level; a plurality of analog/digital conversion units configured to convert signals respectively corresponding to a signal level that is converted from an optical signal and is output by the plurality of light receiving elements and a reset level that is output independent of an optical signal, into digital signals, according to the reference level; a plurality of amplifier units configured to amplify a signal; and a plurality of correlated double sampling units configured to perform correlated double sampling per each of the light receiving elements by using a signal based on the reset level and a signal based on the signal level, wherein the amplifier units amplify the signal corresponding to the reset level and the signal corresponding to the signal level before the correlated double sampling units perform the correlated double sampling.

Exemplary embodiments of the present invention also provide an image reading device comprising the above-described photoelectric conversion element.

Exemplary embodiments of the present invention also provide an image forming apparatus comprising: the above-described image reading device; and an image forming unit configured to form an image based on image data read by the image reading device.

Exemplary embodiments of the present invention also provide an image reading method comprising: fixing, to a predetermined reference level, an offset of an output level of each of a plurality of light receiving elements that convert an optical signal into an electrical signal per pixel; converting signals respectively corresponding to a signal level that is converted from an optical signal and is output by the plurality of light receiving elements and a reset level that is output independent of an optical signal, into digital signals, according to the reference level; performing correlated double sampling per each of the light receiving elements by using a signal based on the reset level and a signal based on the signal level, wherein the signal corresponding to the reset level and the signal corresponding to the signal level are amplified before performing the correlated double sampling.

Exemplary embodiments of the present invention also provide a non-transitory computer readable recording medium that contains a computer program that causes a computer to execute: fixing, to a predetermined reference level, an offset of an output level of each of a plurality of light receiving elements that convert an optical signal to an electrical signal per pixel; converting signals respectively corresponding to a signal level that is converted from an optical signal and is output by the plurality of light receiving elements and a reset level that is output independent of an optical signal, into digital signals, according to the reference level; performing correlated double sampling per each of the light receiving elements by using a signal based on the reset level and a signal based on the signal level, wherein the signal corresponding to the reset level and the signal corresponding to the signal level are amplified before performing the correlated double sampling.

BRIEF DESCRIPTION OF THE DRAWINGS

FIG. 2 is a diagram illustrating a configuration example of a photoelectric conversion element according to an embodiment of the present invention;

FIGS. 5A to 5C are diagrams exemplifying a results of A/D conversion by a photoelectric conversion element that includes the clamp unit per processing system, and signal values when the digital CDS is performed;

FIGS. 9A and 9B are diagrams illustrating configuration examples of an amplifier unit and peripherals thereof;

FIG. 10 is a diagram illustrating a relationship between a dynamic range of the A/D converter and an input signal;

FIGS. 11A and 11B are diagrams illustrating configurations of an amplifier circuit that has functions of an amplifier unit and a clamp unit, and peripherals thereof;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figures 1A, 1B:
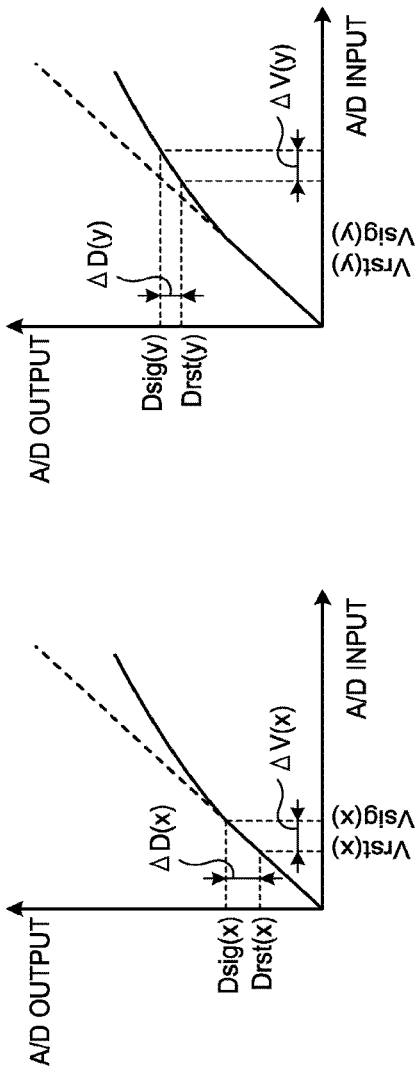
FIGS. 1A to 1C are graphs exemplifying signal values when digital CDS is performed after a value output from a conventional CMOS line sensor is A/D converted.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Figure 1C:
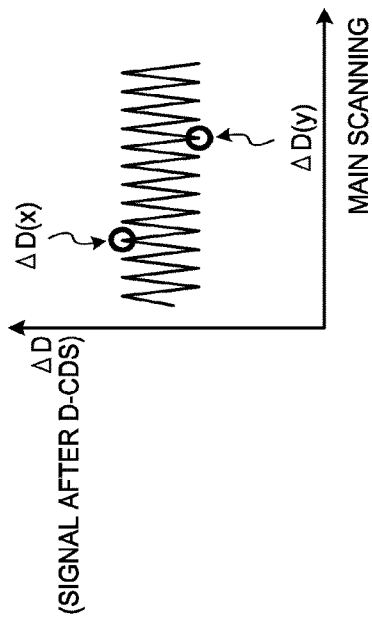

First, the background that has led to achievement of the present invention is explained. FIGS. 1A to 1C are graphs exemplifying signal values when digital CDS is performed after a value output from a conventional CMOS line sensor is subjected to A/D conversion. This example illustrates a case in which a value read by a pixel of the CMOS line sensor is converted into a digital signal by an A/D converter having a bad integral non-linearity error at one end of a full-scale range.

For example, in the A/D converter that is integrated in the CMOS line sensor, relationship between an analog input signal and a digital output signal can deviate from an ideal line as shown in FIGS. 1A to 1G. Ideal A/D convertors with high precision ensure characteristics by adjusting a reference voltage on a semiconductor substrate and the like, or have a component to correct errors, and differ from the above-described A/D convertor to be mounted.

For example, as shown in FIG. 1A, it is assumed that for one pixel x, a difference between a reset level $V_{rst}(x)$ and a signal level $V_{sig}(x)$ that is input to the A/D converter is $\Delta V(x)$, and a difference between the levels after A/D conversion is $\Delta D(x)$. Furthermore, as shown in FIG. 1B, it is assumed that for another pixel y, though an offset differs, a difference between the levels before implementing A/D conversion is $\Delta V(y)$ and a difference between the levels after implementing A/D conversion is $\Delta D(y)$.

If the offset varies per pixel, and the reset level to be a reference varies per A/D converter, even if an electric charge (net signal amount) accumulated in a photodiode of a pixel is the same ($\Delta V(x)=\Delta V(y)$), a signal after A/D conversion is to be $\Delta D(x) \neq \Delta D(y)$ due to linearity characteristics of the A/D converter.

As described above, because of the linearity characteristics of an A/D converter, there is a possibility that a difference ΔD between a reset level and a signal level after implementing A/D conversion varies per processing system that uses the shared A/D converter. That is, in a CMOS sensor that performs A/D conversion with multiple A/D converters, as shown in FIG. 1C, a fixed pattern noise remains per processing system of the A/D converters arranged in a main scanning direction, and a sufficient noise suppression effect by CDS (digital CDS: D-CDS) cannot be obtained.

Next, a photoelectric conversion element 10 according to an embodiment is explained. FIG. 2 is a diagram illustrating a configuration example of the photoelectric conversion element 10 according to the embodiment. The photoelectric conversion element 10 is, for example, a CMOS line sensor that includes a photoelectric conversion unit 12, a processing unit 14, a control unit (timing control unit: TG) 16, a parallel-serial conversion unit 18, and a low voltage differential signaling (LVDS) 19.

The photoelectric conversion unit 12 has N pieces of light receiving elements 120 that are arranged in one direction (main scanning direction). The light receiving element 120 is a photodiode that converts an optical signal into an electrical signal, or the like. Moreover, in the photoelectric conversion unit 12, N pieces of the light receiving elements 120 that receive lights in different colors of R, G, B can be arranged respectively in the main scanning direction. Each of the light receiving elements 120 constitutes pixels that output a signal of a reset level independent of an optical signal, and an analog image signal (signal level) subjected to photoelectric conversion.

The processing unit 14 has N pieces of clamp units (CLP) 20, N pieces of A/D convertors (A/D) 140, N pieces of amplifier units (gain) 142, and N pieces of CDS unit (D-CDS) 144. An analog signal output by the photoelectric conversion unit 12 is clamped to be converted into a digital signal, amplified and subjected to correction by CDS, and is output.

More specifically, the clamp unit 20 is a clamp circuit that has an alternating-current coupling capacitor, and clamps a signal output by the light receiving element 120 to a predetermined reference level, and outputs signals corresponding to a reset level and a signal level to the A/D convertor 140. That is, the clamp unit 20 has a function as an offset fixing unit that fixes an offset of an output level of each of the light receiving elements 120 to the reference level. The clamp unit 20 is described in detail using FIGS. 3A, 3B and the rest.

The A/D converter 140 performs A/D conversion of signals corresponding to a reset level and a signal level that are input from the clamp unit 20, according to the reference level. The amplifier unit 142 amplifies the signals corresponding to the reset level and the signal level that are output by the A/D convertor 140. The CDS unit 144 calculates a difference between the signals corresponding to the reset level and the signal level that are amplified by the amplifier unit 142, to output to the parallel-serial conversion unit 18.

The parallel-serial conversion unit 18 serializes a digital signal that is processed and output in parallel by multiple processing systems to a subsequent stage. The LVDS 19 outputs the serial signal output by the parallel-serial conversion unit 18 as a small-amplitude difference signal. The control unit 16 generates a signal necessary for driving and controlling respective components constituting the photoelectric conversion element 10.

Although a signal subjected to A/D conversion is amplified herein as an example, the signal is only required to be amplified before digital CDS is performed, and it can be an analog signal before A/D conversion that is to be amplified.

Figure 3A:
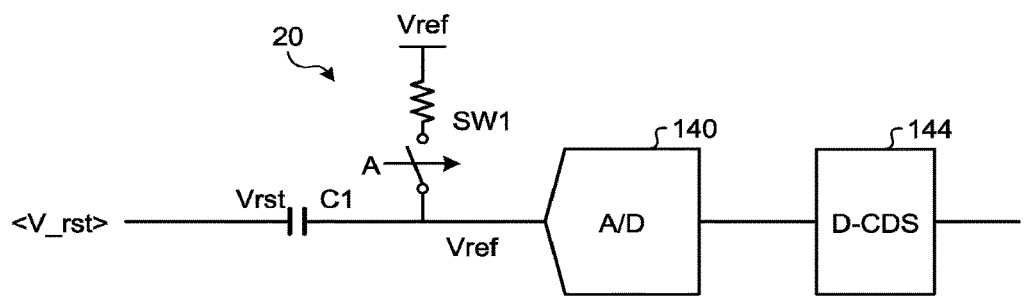
FIGS. 3A and 3B are diagrams illustrating configuration examples and operations of a clamp unit.
Figure 3B:
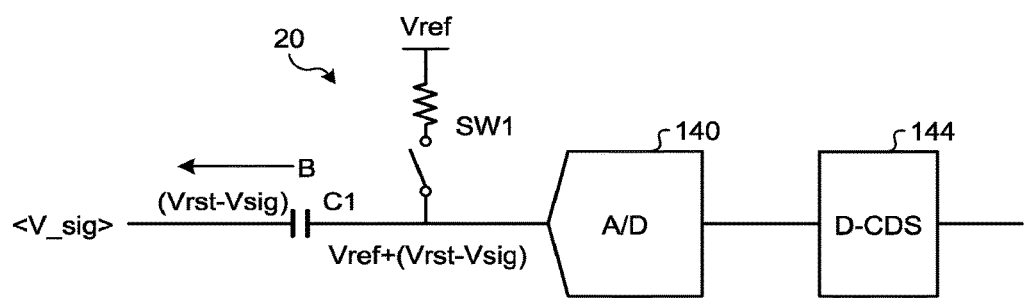
Figure 4:
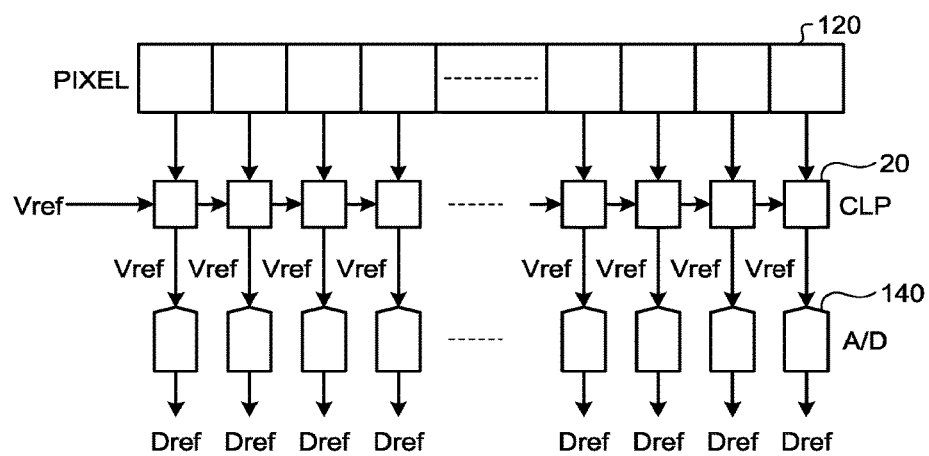
FIG. 4 is a diagram illustrating a state in which plural clamp units respectively output a predetermined reference level while each light receiving element outputs a reset level.

FIGS. 3A and 3B are diagrams illustrating configuration examples and operations of the clamp unit 20. As shown in FIG. 3A, when a reset level Vrst is output from the light receiving element 120, SW1 is to be ON in the clamp unit 20, and Vref is input to the A/D convertor 140. Thus, when the light receiving element 120 outputs the reset level Vrst, the clamp unit 20 outputs the predetermined reference level Vref to the A/D convertor 140 (arrow A). Therefore, as shown in FIG. 4, even if the offset of the multiple light receiving elements 120 varies, the multiple clamp units 20 output the predetermined reference level Vref to the A/D convertor 140 when the respective light receiving elements 120 output the reset level Vrst. The output of the respective A/D convertors 140 is to be a digital value (Dref) according to Vref.

On the other hand, as shown in FIG. 3B, when the light receiving element 120 outputs a signal level Vsig, SW1 is to be OFF in the clamp unit 20, and C1 is to be a potential of Vsig. Therefore, an electric current of an electric charge of a difference $\Delta V=(Vrst-Vsig)$ between the reset level and the signal level flows in a direction indicated by the arrow B in FIG. 3B. And, to the A/D convertor 140, $Vref+\Delta V$ is input.

FIGS. 5A to 5C are diagrams exemplifying a results of A/D conversion by the photoelectric conversion element 10 that includes the clamp unit 20 per processing system, and signal values when the digital CDS is performed. In the photoelectric conversion element 10, when the respective light receiving elements 120 output a reset level, the respective A/D convertor 140 A/D convert a fixed value Vref, and when the light receiving elements 120 output a signal level, the respective A/D convertors 140 A/D convert $Vref+\Delta V$. When the respective CDS units 144 calculate a difference for Dref obtained by A/D conversion and $Dref+\Delta D$, the reference level is cancelled, and the photoelectric conversion element 10 can output the electric charge (net signal amount) accumulated in the respective light receiving elements 120.

The photoelectric conversion element 10 can fix a zero-level position by the respective A/D convertors 140, and as shown in FIGS. 5A and 5B, if $\Delta V(x)=\Delta V(y)$, the signal after A/D conversion is also $\Delta D(x)=\Delta D(y)$. Therefore, the photoelectric conversion element 10 can suppress variations in difference between a reset level and a signal level as shown in FIG. 5C, even if the offset of the respective light receiving elements 120 in the main scanning direction varies, and can prevent a fixed pattern noise.

Figure 6:
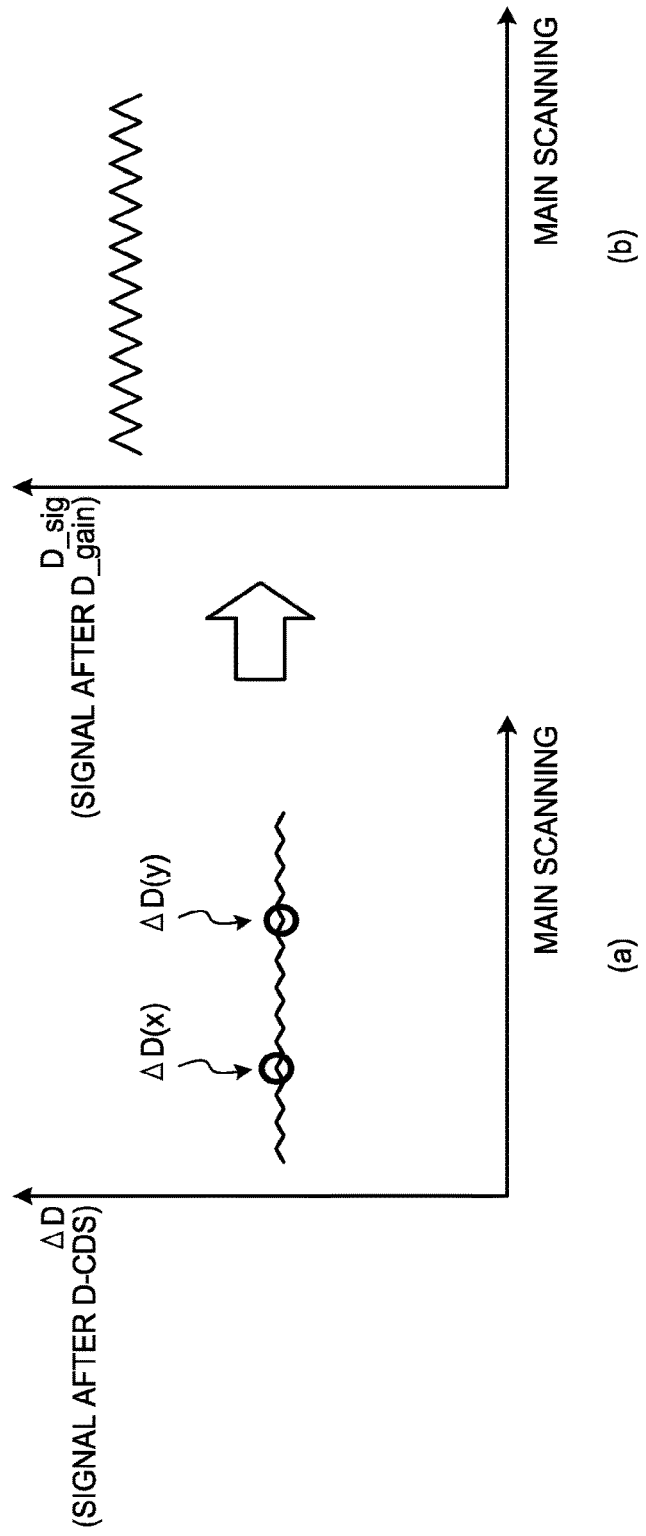
FIG. 6 is a diagram illustrating a problem that occurs when a conventional CMOS line sensor amplifies a signal after CDS.

When a signal is amplified after the CMOS line sensor performs CDS as in a conventional technique, a problem shown in FIG. 6 can occur. When a signal is amplified after the CMOS line sensor performs CDS, if a little fixed pattern noise remains as shown in a section (a) of FIG. 6, the fixed pattern noise becomes significant in a signal D_sig after digital gain application as shown in a section (b) of FIG. 6.

Figure 7:
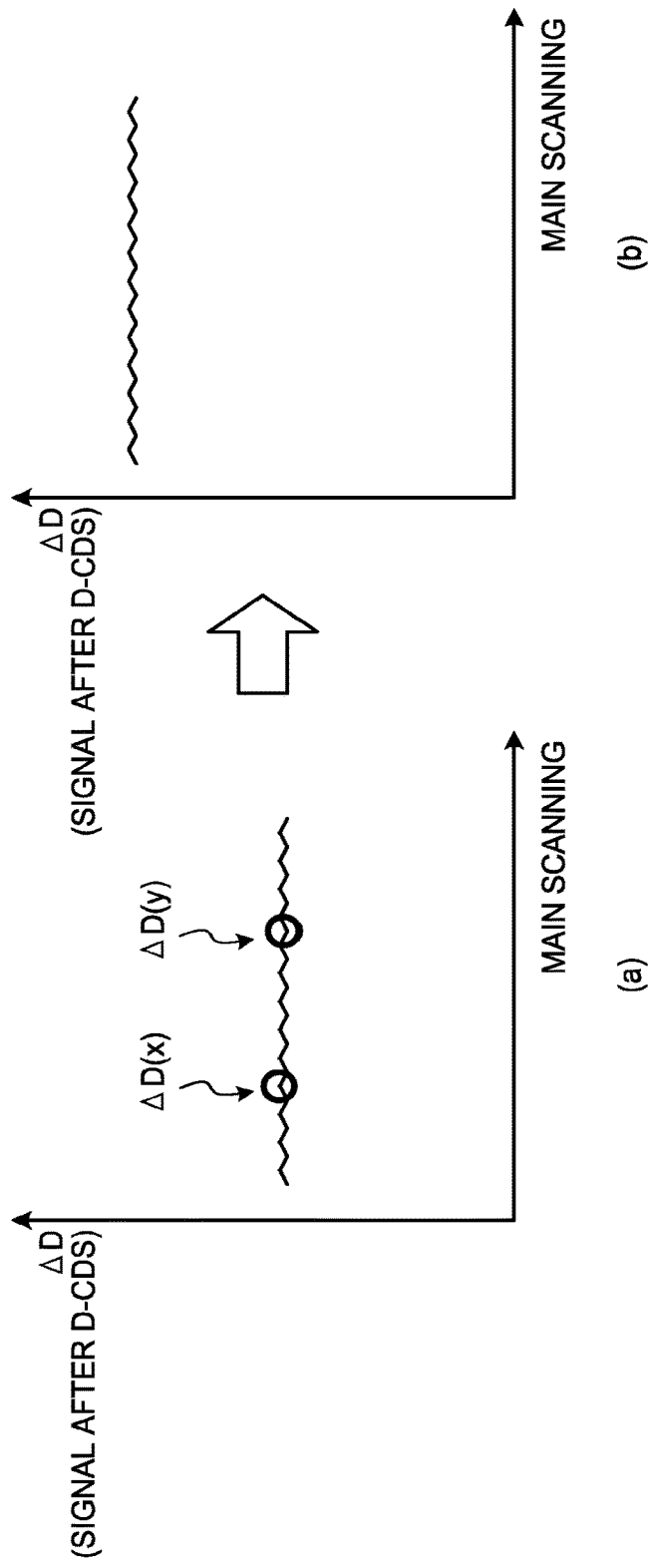
FIG. 7 is a diagram illustrating a state in which the photoelectric conversion element according to the embodiment cancels a noise that is to be amplified by the digital CDS.

In contrast, in the photoelectric conversion element 10 according to the embodiment, because the amplifier unit 142 amplifies (applies a digital gain) a digital signal before the CDS unit 144 performs digital CDS, even if a noise is amplified, as shown in FIG. 7, the noise amplified by digital CDS is to be cancelled. When a digital gain is applied, the signal bit number can be reduced in a stage subsequent thereto, and a wiring area in a chip can be reduced.

Figure 8:
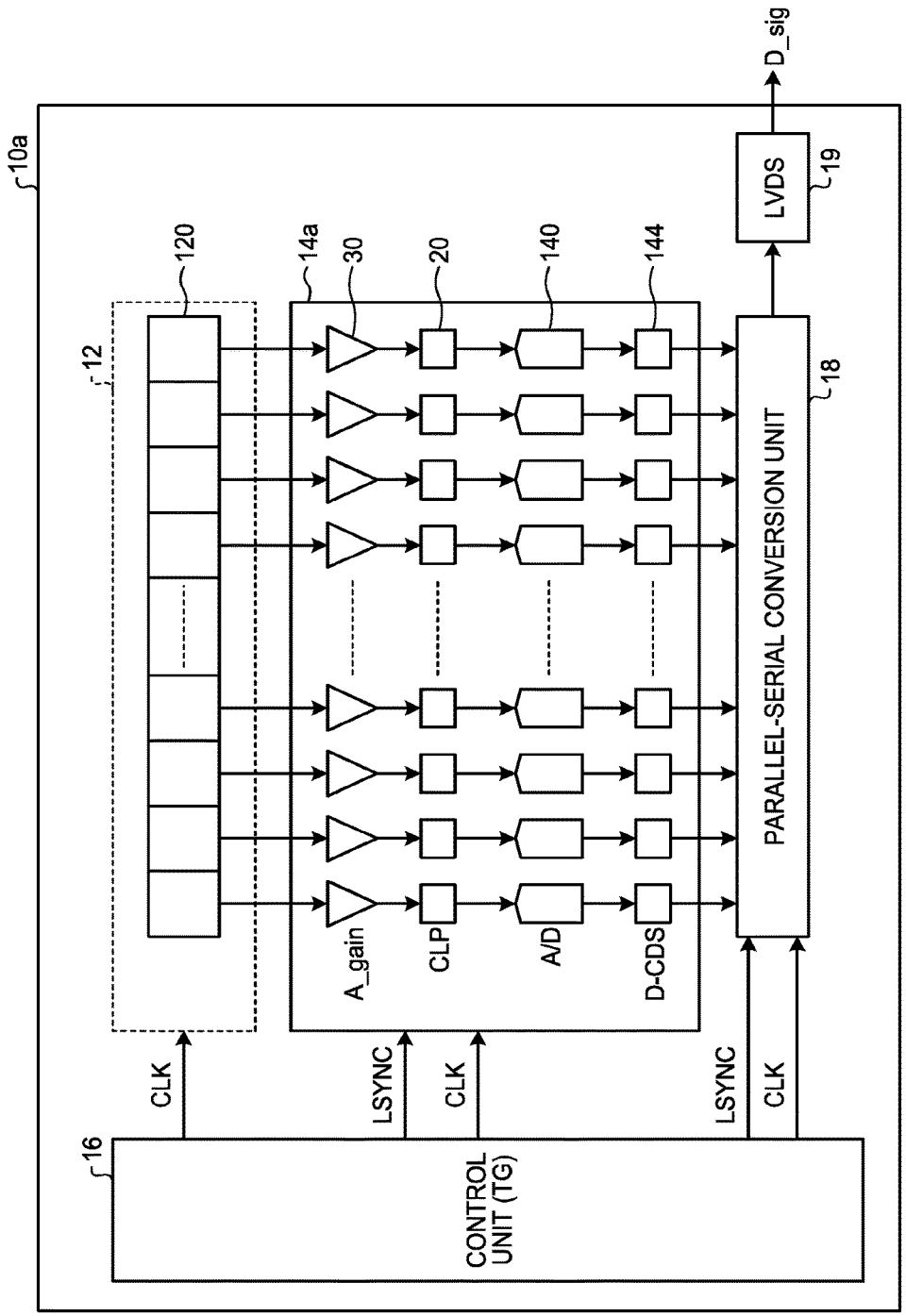
FIG. 8 is a diagram illustrating a configuration of a modification of a photoelectric conversion element.

Next, a modification of the photoelectric conversion element 10 is explained. FIG. 8 is a diagram illustrating a configuration of a modification (photoelectric conversion element 10a) of the photoelectric conversion element 10. The photoelectric conversion element 10a includes the photoelectric conversion unit 12, a processing unit 14a, the control unit 16, the parallel-serial conversion unit 18, and the LVDS 19, and differs from the photoelectric conversion element 10 in that a signal output by the light receiving element 120 is amplified before A/D conversion. The processing unit 14a includes an amplifier unit (A_gain) 30, the clamp unit 20, the A/D convertor 140, and the CDS unit 144.

FIGS. 9A and 9B are diagrams illustrating a configuration examples of the amplifier unit 30 and peripherals thereof. The amplifier unit 30 includes a programmable gain amplifier (PGA: amplifier) 300, and amplifies an analog signal. As shown in FIG. 9A, when the light receiving element 120 outputs a reset level, the PGA 300 amplifies Vrst to RS/R1 times as much. At this time, SW1 of the clamp unit 20 is turned into ON, and Vref is input to the A/D convertor 140. That is, when the reset level Vrst is output from the light receiving element 120, the clamp unit 20 outputs the predetermined reference level Vref to the A/D convertor 140.

On the other hand, as shown in FIG. 9B, when the light receiving element 120 outputs Vsig, SW1 is OFF in the clamp unit 20, and C1 is to be a potential of $Vsig \cdot R2/R1$. An electric current of an electric charge of a difference $Vrst \cdot R2/R1 - Vsig \cdot R2/R1 = (Vrst-Vsig)$ between the reset level and the signal level flows in a direction indicated by the arrow in FIG. 9B. At this time, to the A/D convertor 140, $Vref+(Vrst-Vsig) \cdot R2/R1$ is input.

As described, because the photoelectric conversion element 10a performs A/D conversion by the A/D converter 140 after a signal is amplified by the amplifier unit 30, As shown in a section (b) of FIG. 10, an input dynamic range of the A/D converter 140 can be effectively used. Vtp is an upper side (top) reference voltage of the A/D converter 140, and Vbt is a lower side (bottom) reference voltage of the A/D converter 140.

A section (a) of FIG. 10 illustrates, as a comparison example, relationship between a dynamic range of the A/D converter 140 and an input signal when a signal is not amplified by the amplifier unit 30. In this case, the dynamic range of the A/D converter cannot be used effectively, and it can be impossible to ensure tones.

Moreover, in the processing unit 14a, the amplifier unit 30 and the clamp unit 20 can be configured by a single integrated amplifier circuit having the PGA (amplifier) 300. FIGS. 11A and 11B are diagrams illustrating configurations of an amplifier circuit 40 that has functions of the amplifier unit 30 and the clamp unit 20, and peripherals thereof.

As shown in FIG. 11A, when the light receiving element 120 outputs the reset level Vrst, SW1 is turned ON in the amplifier circuit 40, and a (−) input of the A/D converter 140 and an input of the PGA 300 are shorted out. At this time, the potential of each component of the amplifier circuit 40 is to be Vref, and Vref is input to the A/D converter 140. That is, when the light receiving element 120 outputs the reset level Vrst, the amplifier circuit 40 outputs the predetermined reference level Vref to the A/D converter 140.

On the other hand, as shown in FIG. 11B, when the light receiving element 120 outputs the signal level Vsig, SW1 is turned OFF in the amplifier circuit 40, and C1 is to be a at a potential of Vsig. An electric current of an electric charge of a difference $\Delta$=(Vrst−Vsig) between the reset level and the signal level flows in a direction indicated by the arrow in FIG. 11B. The difference $\Delta$ is a ratio between capacities C1 and C2, to be $\Delta \cdot C1/C2$, and to the A/D convertor 140, Vref+$\Delta \cdot C1/C2$ is input.

Figure 12:
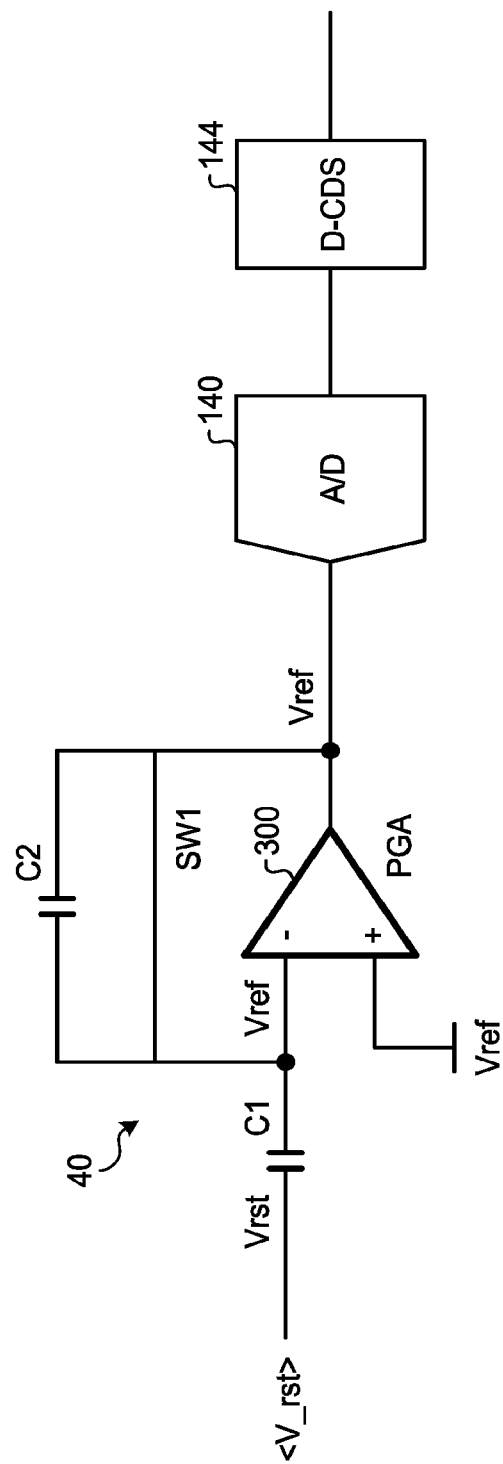
FIG. 12 is a diagram illustrating the amplifier circuit in a state in which SW is ON, and peripherals thereof.

As shown in FIG. 12, when a reset level is clamped to a predetermined reference level, the amplifier circuit 40 outputs the reference level Vref to the A/D converter 140 in a state in which SW is ON. When SW1 is turned ON, an on-resistance occurs in SW1 in the amplifier circuit 40. That is, when SW1 is turned ON, a value of Vref can fluctuate a little by an influence of a switching noise. As this fluctuation slightly varies depending on the amplifier circuits 40, Dref after A/D conversion performed by each of the A/D converters 140 can vary as shown in FIG. 13A.

Figure 13:
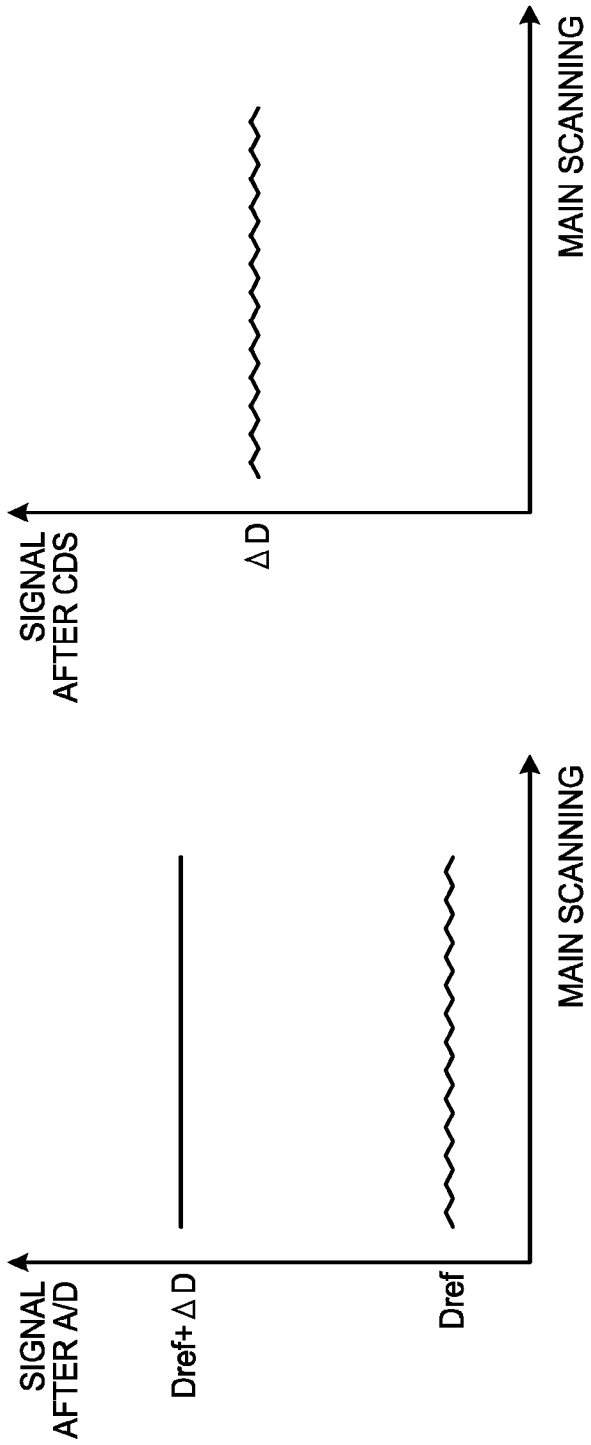
FIGS. 13A and 13B are diagrams illustrating fluctuations of Dref and fluctuations of ΔD.

On the other hand, when SW1 is turned OFF while the light receiving element 120 outputs a signal level, and Vref+$\Delta$V corresponding to the signal level is input to the A/D converter 140, there is no influence of a switching noise, and Dref+$\Delta$V does not fluctuate as shown in FIG. 13A. Therefore, as shown in FIG. 13B, fluctuation of $\Delta$D can occur even if CDS is performed.

Figure 14:
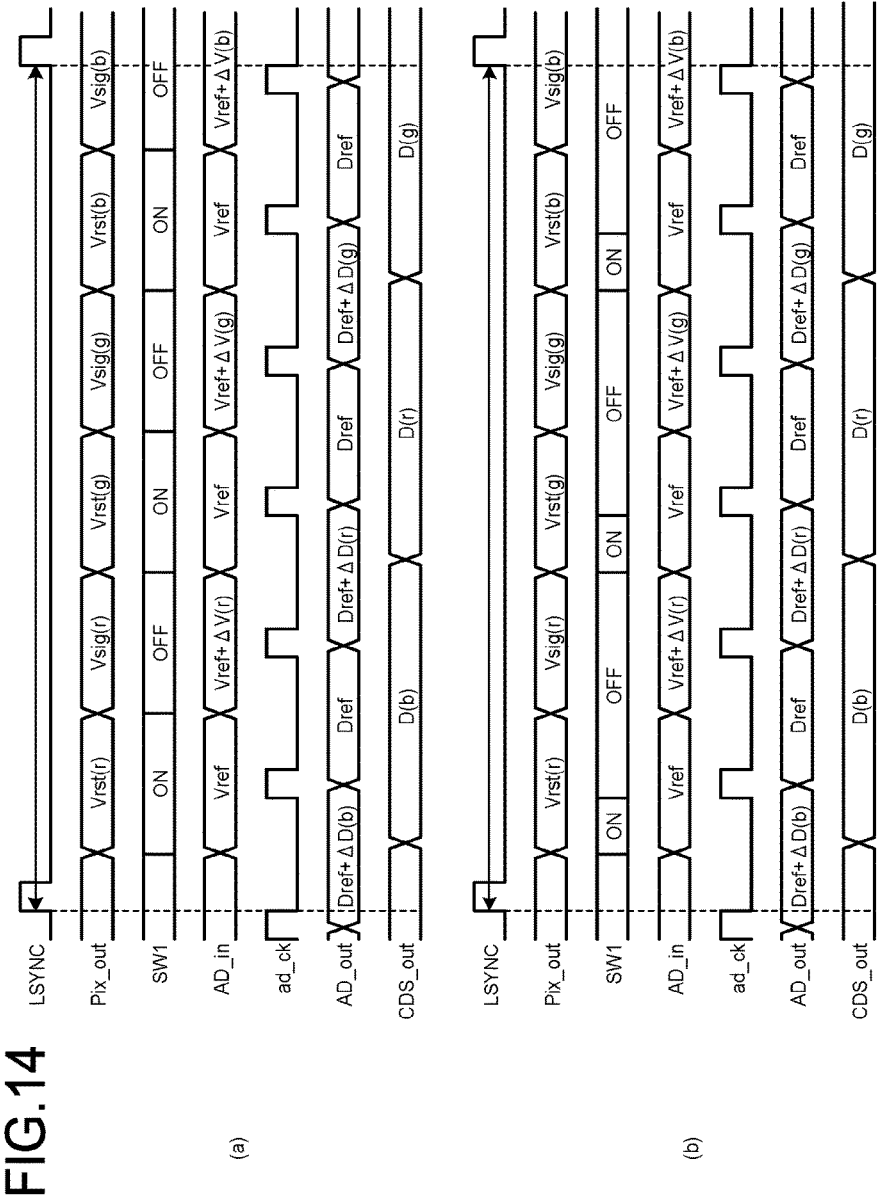
FIG. 14 is a timing chart illustrating operation of the photoelectric conversion element that includes the amplifier circuit.

Therefore, as shown in a section (b) of FIG. 14, the amplifier circuit 40 is configured to have the same operation condition at the time of outputting a reset level and at the time of outputting a signal level. Specifically, before AD_CK is output and the A/D converter 140 starts A/D conversion, SW1 is turned OFF in the amplifier circuit 40. As described, A/D conversion is possible to be performed in the same circuit condition (SW1 is OFF) at the time of outputting a reset level and at the time of outputting a signal level. Therefore, the amplifier circuit 40 can prevent fluctuations of Dref shown in FIGS. 13A and 13B.

A section (a) of FIG. 14 illustrates, as a comparison example, an operation in a case in which SW1 is turned ON when the respective light receiving elements 120 output a reset level, and in which Vref is A/D converted by the A/D converter 140 in a state in which SW1 is ON.

Figure 15:
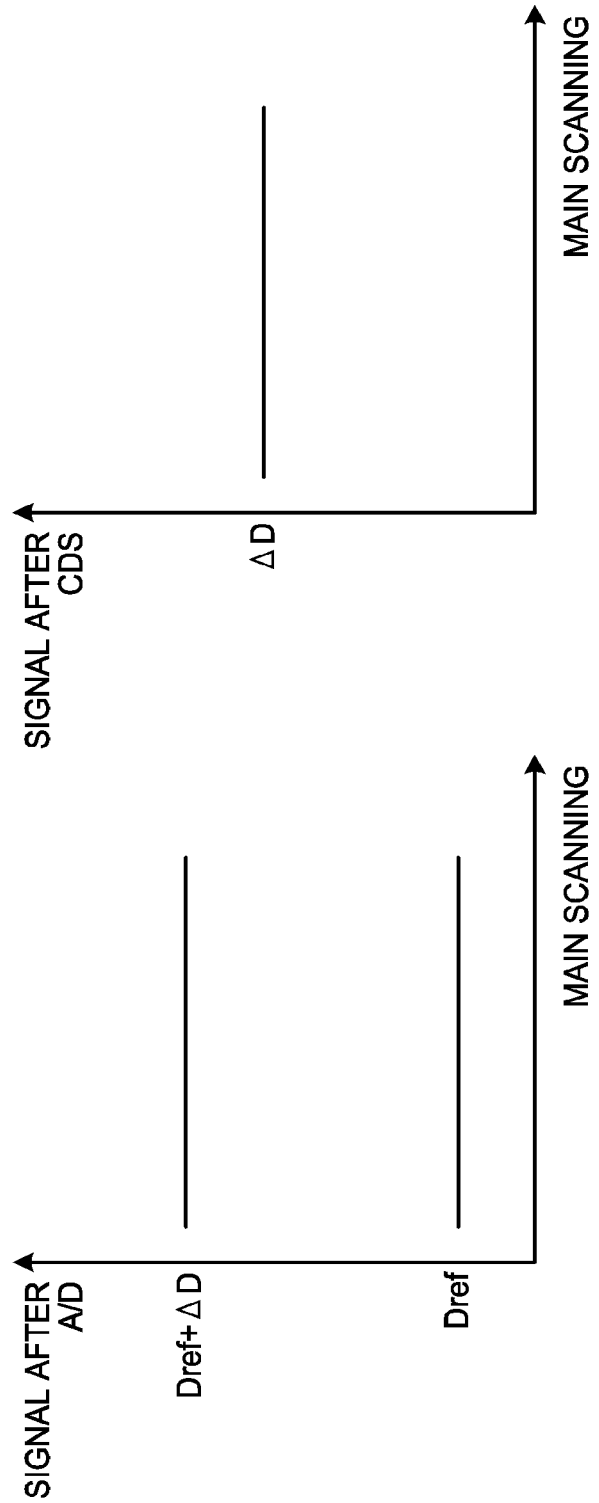
FIGS. 15A and 15B are diagrams illustrating a state in which fluctuations of Dref and fluctuations of ΔD are prevented.

FIGS. 15A and 15B are diagrams illustrating signals that are output by the A/D converter 140 and the CDS unit 144 when the operation shown in the section (b) of FIG. 14 is performed. As shown in the section (b) of FIG. 14, when the light receiving element 120 outputs a reset level, if SW1 of the amplifier circuit 40 is turned OFF before the A/D converter 140 A/D converts the reference level Vref, Dref does not receive an influence of a switching noise, and therefore does not fluctuates (FIG. 15A). Therefore, the signal after CDS does not fluctuate (FIG. 15B).

While the photoelectric conversion element 10 (photoelectric conversion element 10a) performs CDS (digital CDS) using digital data subjected to A/D conversion as described above, CDS (analog CDS) in which a difference between a reset level and a signal level is calculated using an analog signal before subjected to A/D conversion has also been known as a known technique. With the analog CDS also, a certain effect can be obtained to remove a fixed pattern noise; however, a noise that occurs as a result of performing the analog CDS cannot be suppressed. As the photoelectric conversion element 10 (photoelectric conversion element 10a) according to the embodiment performs CDS using a signal subjected to A/D conversion, it is not affected by a noise that is caused by the analog CDS.

Figure 16:
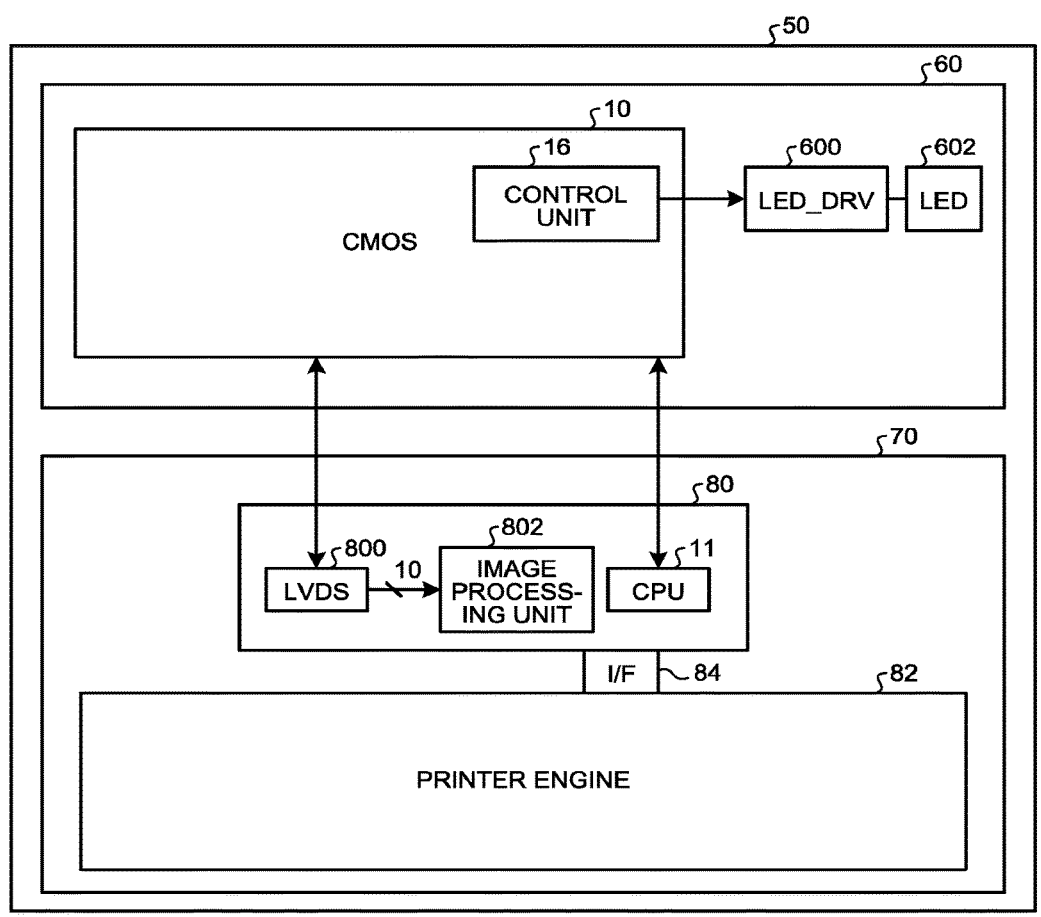
FIG. 16 is a diagram illustrating an outline of an image forming apparatus that includes an image reading device having the photoelectric conversion element.

Next, an image reading device and an image forming apparatus that include the photoelectric conversion element 10 according to the embodiment are explained. FIG. 16 is a diagram illustrating an outline of an image forming apparatus 50 that includes an image reading device 60 having the photoelectric conversion element 10. The image forming apparatus 50 is, for example, a copier, a multifunction peripheral (MFP), or the like that includes the image reading device 60 and an image forming unit 70.

The image reading device 60 includes, for example, the photoelectric conversion element 10, a light emitting diode (LED) driver (LED_DRV) 600, and an LED 602. The LED driver 600 drives the LED 602, for example, in synchronization with a line synchronization signal that is output by the control unit 16. The LED 602 irradiates light to an original. The photoelectric conversion element 10 receives reflection light from the original in synchronization with a line synchronization signal or the like, and generates an electric charge by multiple light receiving elements, to start accumulation thereof. The photoelectric conversion element 10 performs parallel-serial conversion and the like, and then outputs image data to the image forming unit 70.

The image forming unit 70 includes a processing unit 80 and a printer engine 82. The processing unit 80 and the printer engine 82 are connected to each other through an interface (I/F) 84.

The processing unit 80 includes an LVDS 800, an image processing unit 802, and a central processing unit (CPU) 11. The CPU 11 executes a program that is stored in a memory or the like, and controls respective components constituting the image forming apparatus 50, such as the photoelectric conversion element 10.

The photoelectric conversion element 10 outputs, for example, image data of an image that is read by the image reading device 60, a line synchronization signal, a transmission clock, and the like to the LVDS 800. The LVDS 800 converts the received image data, the line synchronization signal, the transmission clock, and the like into parallel 10-bit data. The image processing unit 802 performs image processing using the 10-bit data obtained by conversion, and outputs the image data and the like to the printer engine 82. The printer engine 82 performs printing with the received image data.

According to exemplary embodiments of the present invention, an effect that the noise suppression effect by CDS can be improved is obtained.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A photoelectric conversion element comprising:
a plurality of light receiving circuits configured to convert an optical signal into an electrical signal per pixel;
a plurality of offset fixing circuits configured to fix an offset of an output level of each of the light receiving circuits to a predetermined reference level;
a plurality of analog/digital conversion circuits configured to convert signals respectively corresponding to a signal level that is converted from an optical signal and is output by the plurality of light receiving circuits and a reset level that is output independent of an optical signal, into digital signals, according to the predetermined reference level, wherein when the reset level is output from any one of the plurality of light receiving circuits, the respective offset fixing circuit connects a predetermined reference level source of the predetermined reference level to an input of the respective analog/digital conversion circuit so that the respective analog/digital conversion circuit receives only a signal having the predetermined reference level which is configured to be the same value for each of the plurality of offset fixing circuits when each of the plurality of light receiving circuits outputs the reset level, and when the signal level is output from any one of the plurality of light receiving circuits, the respective analog/digital conversion circuit receives an input of a signal having the predetermined reference level added to a difference between the reset level output from the respective light receiving circuit and the signal level output from the respective light receiving circuit;
a plurality of amplifier circuits configured to amplify a signal; and
a plurality of correlated double sampling circuits configured to perform correlated double sampling per each of the light receiving circuits by using a signal based on the reset level and a signal based on the signal level, wherein the amplifier circuits amplify the signal corresponding to the reset level and the signal corresponding to the signal level before the correlated double sampling circuits perform the correlated double sampling.

2. The photoelectric conversion element according to claim 1, wherein
each offset fixing circuit is a clamp circuit that includes an alternating-current coupling capacitor.

3. The photoelectric conversion element according to claim 1, wherein
the analog/digital conversion circuits convert a signal that has been amplified by the amplifier circuits to a digital signal.

4. The photoelectric conversion element according to claim 1, wherein
each offset fixing circuit and each amplifier circuit are respectively implemented with a same single amplifier circuit that includes an amplifier.

5. The photoelectric conversion element according to claim 4, wherein
each amplifier circuit is in an identical operation condition when each analog/digital conversion circuit converts signals respectively corresponding to the signal level and the reset level into digital signals.

6. The photoelectric conversion element according to claim 1, wherein
the amplifier circuits amplify the digital signals that have been converted by the analog/digital conversion circuits.

7. An image reading device comprising
the photoelectric conversion element according to claim 1.

8. An image forming apparatus comprising:
the image reading device according to claim 7; and
an image forming device configured to form an image based on image data read by the image reading device.

9. An image reading method, implemented by an image reading device, comprising:
fixing, by at least one of a plurality of offset fixing circuits, to a predetermined reference level, an offset of an output level of each of a plurality of light receiving circuits that convert an optical signal into an electrical signal per pixel;
converting, by a plurality of analog/digital conversion circuits, signals respectively corresponding to a signal level that is converted from an optical signal and is output by the plurality of light receiving circuits and a reset level that is output independent of an optical signal, into digital signals, according to the predetermined reference level, wherein when the reset level is output from any one of the plurality of light receiving circuits, the respective offset fixing circuit connects a predetermined reference level source of the predetermined reference level to an input of the respective analog/digital conversion circuit so that the respective analog/digital conversion circuit receives only a signal having the predetermined reference level which is configured to be the same value for each of the plurality of offset fixing circuits when each of the plurality of light receiving circuits outputs the reset level, and when the signal level is output from any one of the plurality of light receiving circuits, the respective analog/digital conversion circuit receives an input of a signal having the predetermined reference level added to a difference between the reset level output from the respective light receiving circuit and the signal level output from the respective light receiving circuit; and performing correlated double sampling per each of the light receiving circuits by using a signal based on the reset level and a signal based on the signal level, wherein the signal corresponding to the reset level and the signal corresponding to the signal level are amplified before performing the correlated double sampling.

10. A non-transitory computer readable recording medium that contains a computer program that causes an image reading device to execute:

fixing, by at least one of a plurality of offset fixing circuits, to a predetermined reference level, an offset of an output level of each of a plurality of light receiving circuits that convert an optical signal into an electrical signal per pixel;

converting, by a plurality of analog/digital conversion circuits, signals respectively corresponding to a signal level that is converted from an optical signal and is output by the plurality of light receiving circuits and a reset level that is output independent of an optical signal, into digital signals, according to the predetermined reference level, wherein when the reset level is output from any one of the plurality of light receiving circuits, the respective offset fixing circuit connects a predetermined reference level source of the predetermined reference level to an input of the respective analog/digital conversion circuit so that the respective analog/digital conversion circuit receives only a signal having the predetermined reference level which is configured to be the same value for each of the plurality of offset fixing circuits when each of the plurality of light receiving circuits outputs the reset level, and when the signal level is output from any one of the plurality of light receiving circuits, the respective analog/digital conversion circuit receives an input of a signal having the predetermined reference level added to a difference between the reset level output from the respective light receiving circuit and the signal level output from the respective light receiving circuit; and performing correlated double sampling per each of the light receiving circuits by using a signal based on the reset level and a signal based on the signal level, wherein the signal corresponding to the reset level and the signal corresponding to the signal level are amplified before performing the correlated double sampling.

* * * * *